(12) United States Patent
Ghayour et al.

(10) Patent No.: US 10,287,858 B2
(45) Date of Patent: May 14, 2019

(54) SYSTEM AND METHOD FOR MODELING COUPLED SYSTEMS OF HYDRODYNAMICS AND SEDIMENT TRANSPORT

(71) Applicant: CHEVRON U.S.A. INC., San Ramon, CA (US)

(72) Inventors: Kaveh Ghayour, The Woodlands, TX (US); Tao Sun, Sugarland, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 773 days.

(21) Appl. No.: 14/918,217

(22) Filed: Oct. 20, 2015

(65) Prior Publication Data

US 2017/0107797 A1 Apr. 20, 2017

(51) Int. Cl.
*E21B 43/00* (2006.01)
*G06F 17/10* (2006.01)
*G01V 99/00* (2009.01)

(52) U.S. Cl.
CPC ............ *E21B 43/00* (2013.01); *G01V 99/005* (2013.01); *G06F 17/10* (2013.01); *G01V 2210/661* (2013.01)

(58) Field of Classification Search
CPC ....... E21B 43/00; G06F 17/10; G01V 99/005; G01V 2210/661

(Continued)

(56) References Cited

U.S. PATENT DOCUMENTS 5,653,592 A 8/1997 Davinroy
5,844,799 A 12/1998 Joseph et al.
(Continued)

FOREIGN PATENT DOCUMENTS

WO 2006036389 A2 8/2005
WO WO2006036389 8/2006

OTHER PUBLICATIONS

PCT International Preliminary Report on Patentability, International Application No. PCT/US2016/050547, dated May 3, 2018, pp. 1-8.
(Continued)

*Primary Examiner* — Eunhee Kim
(74) *Attorney, Agent, or Firm* — Mary R. Bram; Melissa M. Hayworth; Marie L. Clapp

(57) ABSTRACT

A method is described for a method for depositional modeling dependent on geological boundary conditions including receiving a process-based depositional model of a siliciclastic formation; determining a type of boundary condition at each boundary of the process-based depositional model wherein the boundary condition on at least one boundary is one of a flux-preserving boundary condition or a discrete boundary condition and wherein the boundary condition accounts for at least one of time-varying inflow of water and sediments into the process-based depositional model, time-varying outflow of water and sediments out of the process-based depositional model, and downstream controls; modeling rates of sediment and water flow over time, dependent on the boundary condition, to create a modeled depositional system; and analyzing the modeled depositional system to identify potential hydrocarbon reservoirs. The method may be executed by a computer system.

5 Claims, 2 Drawing Sheets

(58) Field of Classification Search
USPC .......................................... 703/9, 10; 702/6
See application file for complete search history.

(56) References Cited

U.S. PATENT DOCUMENTS

| | | | |
|---|---|---|---|
| 6,754,588 | B2 | 6/2004 | Cross et al. |
| 7,043,367 | B2 | 5/2006 | Granjeon |
| 7,251,566 | B2 | 7/2007 | Keen et al. |
| 7,369,980 | B2 | 6/2008 | Deffenbaugh et al. |
| 7,742,875 | B2 | 6/2010 | Li et al. |
| 8,117,019 | B2 | 2/2012 | Sun et al. |
| 8,150,669 | B2 | 4/2012 | Cacas et al. |
| 8,670,288 | B2 | 3/2014 | Bjerkholt |
| 8,892,412 | B2 | 11/2014 | Ghayour et al. |
| 2004/0267454 | A1 | 12/2004 | Granjeon |
| 2007/0219725 | A1* | 9/2007 | Sun ..................... G01V 1/282 702/13 |
| 2010/0223039 | A1 | 2/2010 | Maliassov |
| 2010/0138196 | A1 | 6/2010 | Hui et al. |
| 2010/0198638 | A1* | 8/2010 | Deffenbaugh ......... G01V 11/00 705/308 |
| 2011/0270594 | A1 | 11/2011 | Rudnicki |
| 2011/0290478 | A1 | 12/2011 | Sun et al. |
| 2014/0163883 | A1* | 6/2014 | Granjeon ............. G01V 99/005 702/2 |

OTHER PUBLICATIONS

PCT International Search Report and Written Opinion, dated Dec. 7, 2016, issued in International Application No. PCT/US2016/050547, filed on Sep. 7, 2016, 10 pages.
Granjeon et al., "Using A 3-D Stratigraphic Model to Optimize Reservoir Description", Petroleum Engineer International, Nov. 1, 1998, pp. 51-54, 56.
Cao et al., "Modelling Suspended Sediment in Environmental Turbulent Fluids", School of Mathematical Sciences, Jul. 10, 2014, 34 page(s), University of Adelaide, South Australia 5005.
Simpson et al., "Coupled Model of Surface Water Flow, Sediment Transport and Morphological Evolution", Computers & Geosciences 32, 2006, pp. 1600-1614, Elsevier Ltd.
Hu et al., "Well-Balanced and Flexible Morphological Modeling of Swash Hydrodynamics and Sediment Transport", Coastal Engineering 96, 2015, pp. 27-37, Elsevier B.V.
Gonzalez Rodriguez, "Wave Boundary Layer Hydrodynamics and Cross-Shore Sediment Transport in the Surf Zone", Department of Civil and Environmental Engineering, May 6, 2009, 167 page(s), Massachusetts Institute of Technology.
Hsu et al., "Wave-Induced Sediment Transport and Onshore Sandbar Migration", Coastal Engineering 53, , 2006, pp. 817-824, Elsevier B.V.
Hsu et al., "On Modelling Boundary Layer and Gravity-Driven Fluid Mud Transport", Journal of Geophysical Research, 2007, 14 page(s), vol. 112, C04011, The American Geophysical Union.
De Leeuw et al., "Model Predictions of Wave-Induced Sediment Transport on the Shoreface", M.Sc. Thesis, University of Twente, Apr. 2005, 113 page(s), Enschede.
Tang et al., "Hybrid Model Approaches to Predict Multiscale and Multiphysics Coastal Hydrodynamic and Sediment Transport Processes", Intech, 2011, pp. 71-91, Sediment Transport, Dr. Ginsberg, ISBN: 978-953-307-189-3.
Cinat, "Sediment Transport Models for Shallow Water Equations", Universita Degli Studi Di Pisa Facolta' Di Ingegneria, 2011/2012, p. 121.
Lalli et al., "Sediment Transport: Continuous Versus Discrete Model", Proceedings of the Tenth International Offshore and Polar Engineering Conference, Seattle, USA, 2000, pp. 655-659.
Li et al., "Non-Equilibrium Sediment Transport Process of Local Scour Around Pipelines", Proceedings of the Tenth International Offshore and Polar Engineering Conference, Seattle, USA, 2000, pp. 212-217.
Nakamura et at., "Sediment Transport Calculation Considering Unresolved Scales of Turbulence and Its Application to Scouring Due to Tsunami", International Journal of Offshore and Polar Engineering, Dec. 2014, pp. 269-277, vol. 24, No. 4, The International Society of Offshore and Polar Engineers.
Calantoni et al., "Modelling Sheet-Flow Sediment Transport in Wave-Bottom Boundary Layers Using Discrete-Element Modelling", Phil. Trans. R. Soc. Lond. A, 2004, pp. 1987-2001, 362, The Royal Society.
Poinsot et al., "Boundary Conditions for Direct Simulations of Compressible Viscous Flows", Journal of Computational Physics, 1992, pp. 104-129, 101, The Academic Press, Inc.
Thompson, "Time Dependent Boundary Conditions for Hyperbolic Systems", Journal of Computational Physics, 1987, 24 page(s), 68, The Academic Press, Inc.

\* cited by examiner

SYSTEM AND METHOD FOR MODELING COUPLED SYSTEMS OF HYDRODYNAMICS AND SEDIMENT TRANSPORT

TECHNICAL FIELD

The disclosed embodiments relate generally to techniques for modeling coupled systems of hydrodynamics and sediment transport and, in particular, to methods of improving modeling of coupled systems of hydrodynamics and sediment transport with boundary condition treatments.

BACKGROUND

Exploration for subterranean hydrocarbons requires a good understanding of subsurface siliciclastic rock formations. Merely identifying the structure of subsurface formations is insufficient to determine if the subsurface formation has the properties needed for an economical hydrocarbon reservoir. In particular, it is desirable to understand the spatial distribution of sediment properties and organization of barriers and baffles to hydrocarbon flow within a subsurface formation. These distributions will be dependent on the depositional processes that occurred when the sediments that now form the subsurface formation were originally laid down. Modeling these processes is extremely complex as they are influenced by both the hydrodynamics and the sediment transport as a coupled system.

There exists a need for improved modeling that will allow better understanding of the depositional history of the subsurface rock formation to improve identification of potential hydrocarbon reservoirs in such formations.

SUMMARY

In accordance with some embodiments, a method for depositional modeling dependent on geological boundary conditions may include receiving a process-based depositional model of a siliciclastic formation of interest; determining a type of boundary condition at each boundary of the process-based depositional model wherein the boundary condition on at least one boundary is one of a flux-preserving boundary condition or a discrete boundary condition and wherein the boundary condition accounts for at least one of time-varying inflow of water and sediments into the process-based depositional model, time-varying outflow of water and sediments out of the process-based depositional model, and downstream controls; modeling rates of sediment and water flow over time, dependent on the boundary condition, to create a modeled depositional system; and analyzing the modeled depositional system to identify potential hydrocarbon reservoirs. The flux-preserving boundary condition is formulated to provide a time-varying solution on the at least one boundary that solves for wave amplitudes and uses eigenvalues to determine a propagation direction of the sediment and water flow. The discrete boundary condition is formulated to provide a time-varying solution on the at least one boundary wherein equations defining the sediment and water flow have been discretized in space and time and a numerical flux on an internal edge of a cell adjacent to the at least one boundary is a function of a solution of cell-averaged state variables at a previous time step such that the discrete boundary condition is equivalent to finding an unknown boundary flux edge so that an updated solution at a next time step reflects imposed conditions.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of modeling sediment deposition. These embodiments are designed to be of particular use for modeling of geomorphology and stratigraphy of sedimentary systems with time-varying boundary conditions in fluvial, shallow, or deep water geological environments.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

In recent years, process-based physical models of geomorphology and stratigraphy have become increasingly popular for analyzing and predicting the behavior of sedimentary systems in various environments of deposition. The predictive power of physical models emanates from their reliance on resolving the intricate interaction of underlying processes, among which the hydrodynamics of free-surface flow and the transport of sediments are commonly believed to be the most impactful. The coupling of hydrodynamics and sediment transport results in a hyperbolic system of partial differential equations that supports a "wave-like" solution. Formulation and implementation of time-accurate boundary conditions for process-based models is not trivial and has not received much attention, if any, in academic or industrial publications.

The present invention discloses two boundary treatment frameworks for coupled physical models that can be applied to all commonly encountered boundary types such as time-dependent inlet, outlet, and various types of wall models. This invention is applicable to all physical models of geomorphology and stratigraphy that resolve the flow physics by a depth-averaged or depth-parameterized approach.

The approach is illustrated by considering a prototype of process models that includes but is not limited to:
1) Conservation of mass for the water phase
2) Conservation of mass for each component of suspended sediment
3) Conservation of momentum for the coupled system with a source term that may or may not include the parameterized effect of particle-flow and/or particle-particle momentum exchange.

Figure 1:
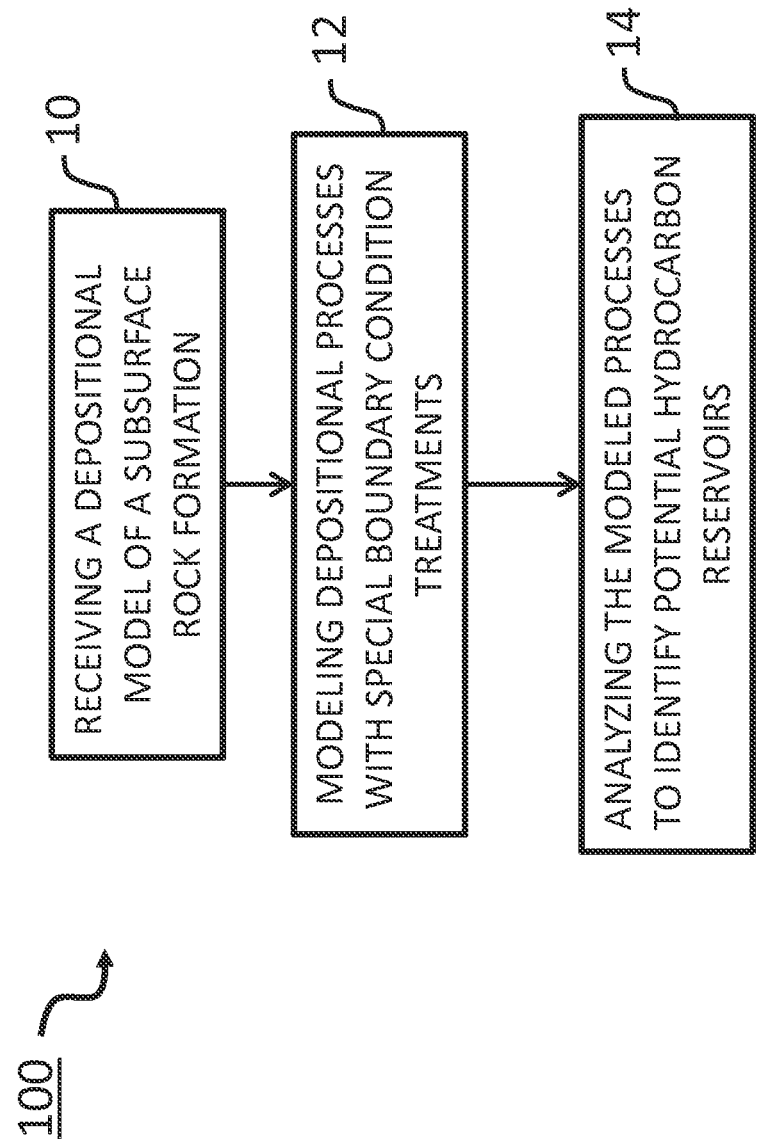
FIG. 1 illustrates a flowchart of a method of depositional modeling, in accordance with some embodiments.

A depositional modeling method 100 is shown in FIG. 1. A process-based depositional model of a siliciclastic formation of interest is received 10. The siliciclastic formation may be in a particular geographic location or may be a synthetic construct. The siliciclastic formation is one generated by depositional processes, for example a turbidite flow or a channel system formed by rivers and/or river deltas. The model represents the physical conditions that would have existed at the earth's surface in order to deposit the sediments that are buried and compacted into the subsurface siliciclastic formation of interest.

At operation 12, the depositional processes are modeled using the model received at operation 10. These depositional processes involve modeling of both the hydrodynamics (water flow) and the sediment transport (sediments suspended in the water). The hydrodynamics and sediment transport are dependent on each other as a coupled system. The modeling is dependent on special boundary conditions at each boundary of the process-based model. As used herein, the term "boundary" refers to an outer bound extremity of a depositional model where reasonable geological conditions are imposed.

The boundary conditions at each boundary of the process-based depositional model may be designed to handle time-varying inflow of water and sediments into basin/reservoir, time-varying outflow of water and sediments out of basin/reservoir, and/or downstream controls such as eustasy and short time scale variations of sea level such as tidal conditions. These may include known boundary conditions such as the wall boundary condition but at least one boundary in the model will be either a flux-preserving boundary condition or a discrete boundary condition.

For the flux-preserving boundary condition, the flow equations start as:

$$\frac{\partial h}{\partial t} + \vec{V} \cdot \nabla h + h \nabla \cdot \vec{V} = S_h \tag{1a}$$

$$\frac{\partial \vec{V}}{\partial t} + \vec{V} \cdot \nabla \vec{V} + \left(R_0 + R \sum_i C_i\right) g \nabla h + \frac{1}{2} g h R \nabla \left(\sum_i C_i\right) = S_{\vec{V}} \tag{1b}$$

$$\frac{\partial C_i}{\partial t} + \vec{V} \cdot \nabla C_i = S_{C_i} \quad i = 1, \ldots, n_g \tag{1c}$$

In Equations (1a-1c), h, $\vec{V}$ and $C_i$ denote the flow depth, depth-averaged flow velocity field with two components along the Cartesian directions, u and v, and the depth-averaged sediment concentration of the $i^{th}$ grain size while g, R and $R_0$ are the gravitational acceleration 9.81 m/s$^2$, the submerged specific gravity of the sediment, and $R_0$ is a scalar equal to unity and zero for subaerial and gravity currents respectively. $S_h$, $S_{C_i}$ and $S_{\vec{V}}$ are the source terms for the water depth, velocity and concentration equations and $n_g \geq 1$ is the number of discrete grain size bins used to closely mimic the continuous distribution of grain sizes. This method borrows ideas from two well-established boundary condition treatments for viscous aerodynamic flows, Poinsot, T. J.: "Boundary Conditions for Direct Simulations of Compressible Viscous Flows", Journal of Computational Physics 101, 104-129 (1992) and Thompson, K. W.: "Time Dependent Boundary Conditions for Hyperbolic Systems", Journal of Computational Physics 68, 1-24 (1987), to develop a novel framework for physical models of geomorphology/stratigraphy where depth-averaged flow is coupled with one or more physical processes. At a boundary point, the governing equations are simplified by neglecting variations in directions parallel to the boundary and the source terms of the conservation laws. As such, the velocity components u and v are now the boundary normal and parallel components of the local velocity respectively.

$$\frac{\partial h}{\partial t} + u \frac{\partial h}{\partial x} + h \frac{\partial u}{\partial x} = 0 \tag{2a}$$

$$\frac{\partial C_i}{\partial t} + u \frac{\partial C_i}{\partial x} = 0 \quad i = 1, \ldots, n_g \tag{2b}$$

$$\begin{cases} \frac{\partial u}{\partial t} + u \frac{\partial u}{\partial x} + \left(R_0 + R \sum_i C_i\right) g \frac{\partial h}{\partial x} + \frac{1}{2} g h R \frac{\partial \sum_i C_i}{\partial x} = 0 \\ \frac{\partial v}{\partial t} + u \frac{\partial v}{\partial x} = 0 \end{cases} \tag{2c}$$

Equations (2a-2c) are the starting point for the derivation of the disclosed framework for boundary treatment of process-based geomorphology/stratigraphy models. This system can be shown to constitute a hyperbolic or "wave-like" system with real eigenvalues. The eigenvalues determine the local propagation directions of various pieces of system information which can be combined to reconstruct the solution.

In an embodiment, the flux-preserving boundary conditions can now be derived by:
Step (1): Reformulating the homogenous system of equations (2a-2c) in terms of appropriate quantities that can be interpreted as the time variation of certain wave amplitudes.
Step (2): Using the sign of the eigenvalues to distinguish between incoming and outgoing bundles of information.
Step (3): Evolving the solution on the boundary in time.

In Step (1), multiply the equations by the left eigenvectors, l, of the Jacobian to write the equations in compact form as $$l_i \frac{\partial U}{\partial t} + \lambda_i l_i \frac{\partial U}{\partial x} = 0 \tag{3}$$

where U=[h, u, v, $C_i$]$^T$ is the state and $$\lambda = [u+c, u-c, \underbrace{u, \ldots, u}_{n_g}]$$

are the eigenvalues of the geomorphic system with c being the propagation velocity of surface waves. The quantities that will be used to rewrite the governing equation are nothing more than $$\Theta_i = \lambda_i l_i \frac{\partial U}{\partial x}.$$

$\Theta_i$ is the time rate of change of 1, $\delta U$ which is a linear combination of the components of the state vector U and are given by:

$$\Theta_1 = \frac{1}{2}(u+c)\left[\delta u + \frac{c}{h}\delta h + \frac{Rgh}{2c}\delta C\right] \quad (4)$$

$$\Theta_2 = \frac{1}{2}(u-c)\left[\delta u - \frac{c}{h}\delta h - \frac{Rgh}{2c}\delta C\right]$$

$$\Theta_3 = -u\delta v$$

$$\Theta_{3+i} = -u\delta C_i \quad i = 1, \ldots, n_g$$

The last step of Step (1) is to recast (3) back in terms of the original state variables U. This is accomplished by premultiplying (3) with the inverse of the matrix of left eigenvectors.

$$\frac{\partial u}{\partial t} = -\Theta_1 - \Theta_2 \quad (5)$$

$$\frac{\partial v}{\partial t} = \Theta_3$$

$$\frac{\partial C_i}{\partial t} = \Theta_{3+i} \quad i = 1, \ldots, n_g$$

$$\frac{\partial h}{\partial t} = -\frac{Rgh^2}{2c^2}\sum_{i=1}^{n_g}\Theta_{3+i} - \frac{h}{c}(\Theta_1 - \Theta_2)$$

Equations (5) are the final form of the original equations that will be used for applying various boundary conditions. With (5), the boundary conditions can be applied at any point on the boundary by solving for the unknowns $\Theta_i$ as follows:

1. For $\lambda_i>0$, the flow of information is from the domain interior towards the boundary and the corresponding $\Theta_i$ is computed by using a one-sided difference operator at the boundary.
2. For $\lambda_i<0$, the flow of information is from exterior towards the interior of the domain and a boundary condition must be imposed. A system of linear equations can be solved for the remaining wave amplitudes that would reflect the desired boundary behavior.

In step (3), advance the boundary solution in time with the aid of Equations (5) and store it for the next time step.

There are many scenarios that may be solved for using this embodiment. For example, this embodiment may be used to model deposition for tidal boundary conditions, wherein the short-term sea level varies but the flow rate Q is constant. Alternatively, the flow rate may vary while other parameters are held constant, as in the following example.

Example: Subcritical Inlet of a Subaerial or Gravity Current

At a subcritical inlet, $\Theta_i$ and $\Theta_{3+i}$, $i=1, \ldots, n_g$, bring information into the domain and need to be solved for by imposing appropriate boundary conditions while $\Theta_2$ is computed by a one-sided derivative stencil using the interior solution. As such, $n_g+2$ boundary conditions are required. If we decide to impose zero tangential velocity and the time rate of change the concentration of all incoming grain sizes, one immediately gets:

$$\Theta_3 = 0.0$$

$$\Theta_{3+i} = \frac{\partial C_i}{\partial t} \quad i = 1, \ldots, n_g$$

One extra boundary condition is still needed to determine $\Theta_1$. For instance, if the time rate of change of incoming volumetric flow rate, Q, is known, one can differentiate Q=uh, with respect to time and substitute from (5) for the time derivatives of the state variables and find the remaining unknown $\Theta_1$. At this stage (5) can be advanced in time and the boundary state will be stored for future use.

Although the above-mentioned flux preserving boundary technique handles most complex flow conditions, numerical experimentation shows that for small spatial domains with active sedimentation at or in the vicinity of boundaries it may introduce unphysical oscillations. The following embodiment, using the discrete boundary condition, is a boundary treatment technique that does not honor the physics of wave propagation as rigorously as the former technique but provides a stable implementation of physical boundary conditions in severe conditions of rapid temporal bathymetry changes at boundaries. The simulation will periodically check for rates of sedimentation and/or rate of change of water depth along the boundary to choose between the two approaches. For the discrete boundary condition, a different set of equations is the starting point:

$$\frac{\partial u}{\partial t} + \frac{\partial F}{\partial x} + \frac{\partial G}{\partial y} = S \quad (6)$$

$$u = \begin{bmatrix} h \\ hu \\ hv \\ hC_i \end{bmatrix}$$

$$F = \begin{bmatrix} hu \\ hu^2 + \frac{1}{2}\left(R_w + R\sum_{i=1}^{n_g} C_i\right)gh^2 \\ huv \\ huC_i \end{bmatrix}$$

$$G = \begin{bmatrix} hv \\ huv \\ hv^2 + \frac{1}{2}\left(R_w + R\sum_{i=1}^{n_g} C_i\right)gh^2 \\ hvC_i \end{bmatrix}$$

$$S = \begin{bmatrix} w_e \\ -\left(R_w + R\sum_{i=1}^{n_g} C_i\right)gh\eta_x - C_d u|V| \\ -\left(R_w + R\sum_{i=1}^{n_g} C_i\right)gh\eta_y - C_d v|V| \\ E_i - D_i \end{bmatrix}$$

In Equations (6), h, V and $C_i$ denote the flow depth, depth-averaged flow velocity field with two components along the Cartesian directions, u and v, and the depth-averaged sediment concentration of the $i^{th}$ grain size while g, R, $R_w$, $\eta_x$, and $\eta_y$ are the gravitational acceleration 9.81 m/s$^2$, the submerged specific gravity of the sediment, $R_w$ is a scalar equal to unity and zero for subaerial and gravity currents respectively, and the bed slope in the x and y directions, respectively. $E_i$ and $D_i$ represent the time rate of erosion and deposition and $C_d$ is the friction coefficient at the bed.

The main steps for deriving the discrete boundary conditions are:

Step (1): Discretize the governing equations (6) in space and time.

Step (2): The numerical flux on the internal edges of a cell adjacent to a boundary segment are a function of the solution of cell-averaged state variables at the previous time step. These numerical fluxes are considered as known and lumped into the source term which is also computed at the previous time step.

Step (3): The boundary condition treatment is now equivalent to finding the unknown boundary flux edge such that the updated solution at the next time step precisely reflects the imposed conditions.

Step (4): For hard boundary conditions, the flux components are computed such that the state variables in the immediate interior cell reflect the conditions.

Step (5): For the remaining components of the state, the time rate of change of a suitably chosen cell averaged variable is extrapolated from the interior domain and is being used to find the remaining components of the boundary flux.

The approach is illustrated for a subcritical inlet. The "hard" boundary conditions are chosen to be the time rate of change of water discharge, $Q_t$, and incoming sediment concentrations, $C_{it}$.

$$\frac{\partial h u_n}{\partial t} = Q_t \quad \frac{\partial C_i}{\partial t} = C_{it} \quad i=1,\ldots,n_g \tag{7}$$

In Step (1), we discretize the governing equations from time step n to n+1 with a finite volume method on a rectangular cell centered at (i,j) and with its boundary edges at half increments in the indices i and j relative to cell center coordinates.

$$\bar{u}^{n+1} - \bar{u}^n + \left(\frac{\Delta t}{\Delta x \Delta y}\right)\left[\left(F_{i+\frac{1}{2},j} - F_{i-\frac{1}{2},j}\right)\Delta y + \left(G_{i,j+\frac{1}{2}} - G_{i,j-\frac{1}{2}}\right)\Delta x\right] = S\Delta t \tag{8}$$

Assuming that the inlet boundary condition is imposed on the boundary edge (i−½,j) and the flux associated with this edge is denoted by $F_b$, it is noted that all other flux terms in (8) can be considered as known determined by the interior solution at the previous time step n. Equation (8) can be further simplified if the known terms are lumped into the source term Π that is calculated at the previous time step as follows:

$$\bar{u}^{n+1} - \bar{u}^n - \left(\frac{\Delta t}{\Delta x}\right)F_b = \Pi \tag{9}$$

$$\Pi = S\Delta t - \left(\frac{\Delta t}{\Delta x \Delta y}\right)\left[F_{i+\frac{1}{2},j}\Delta y + \left(G_{i,j+\frac{1}{2}} - G_{i,j-\frac{1}{2}}\right)\Delta x\right]$$

The second and third components of the unknown boundary flux are set such that the updated cell-averaged solution satisfies the imposed time rate of change of water discharge.

$$F_{b2} = \Delta x\left(Q_t - \frac{\Pi_2}{\Delta t}\right) \tag{10}$$

$$F_{b3} = -\frac{\Delta x}{\Delta t}\Pi_3$$

The first component of the boundary flux is found by extrapolating the time rate of change of water depth from the interior domain $$\left(\frac{\partial h}{\partial t}\right)_i = 2\left(\frac{\partial h}{\partial t}\right)_{i+1} - \left(\frac{\partial h}{\partial t}\right)_{i+2} \tag{11}$$

The first component of the boundary flux can then be computed by using (10) in (9):

$$F_{b1} = \Delta x\left(\left(\frac{\partial h}{\partial t}\right)_i - \frac{\Pi_1}{\Delta t}\right) \tag{12}$$

The remaining components are found by imposing the rate of change of the sediment concentrations in (9):

$$\bar{h}^{n+1}\bar{C}^{n+1} - \bar{h}^n\bar{C}^n - \left(\frac{\Delta t}{\Delta x}\right)F_{b(3+i)} = \Pi_{3+i} \tag{13}$$

$$\left(\bar{h}^n + \left(\frac{\partial h}{\partial t}\right)_i \Delta t\right)\left(\bar{C}_i^n + \left(\frac{\partial \bar{C}_i}{\partial t}\right)_i \Delta t\right) - \bar{h}^n\bar{C}^n - \left(\frac{\Delta t}{\Delta x}\right)F_{b(3+i)} = \Pi_{3+i}$$

$$i = 1, \ldots, n_g$$

$$F_{b(3+i)} = \Delta x\left(\bar{C}_i^n\left(\frac{\partial h}{\partial t}\right)_i + \bar{h}^n\left(\frac{\partial \bar{C}_i}{\partial t}\right)_i + \left(\frac{\partial h}{\partial t}\right)_i\left(\frac{\partial \bar{C}_i}{\partial t}\right)_i \Delta t\right) - \left(\frac{\Delta x}{\Delta t}\right)\Pi_{3+i}$$

In (13), the bar above cell-centered variables denotes depth-averaged and/or parameterized quantities.

With the boundary flux computed, the solution can be advanced in time with $$\bar{u}^{n+1} = \bar{u}^n - \left(\frac{\Delta t}{\Delta x \Delta y}\right)\left[\left(F_{i+\frac{1}{2},j} - F_b\right)\Delta y + \left(G_{i,j+\frac{1}{2}} - G_{i,j-\frac{1}{2}}\right)\Delta x\right] + S\Delta t$$

Referring again to method 100, after the depositional history of the siliciclastic rock has been modeled using the special boundary conditions, the modeled processes may be used to identify potential hydrocarbon reservoirs 14. For example, the modeled processes can reveal possible porosity distribution, channel structure, and/or barriers and baffles to hydrocarbon flow. This information is useful for delineating a potential hydrocarbon reservoir, estimating potential reserves, and well planning including both production and injection wells.

Figure 2:
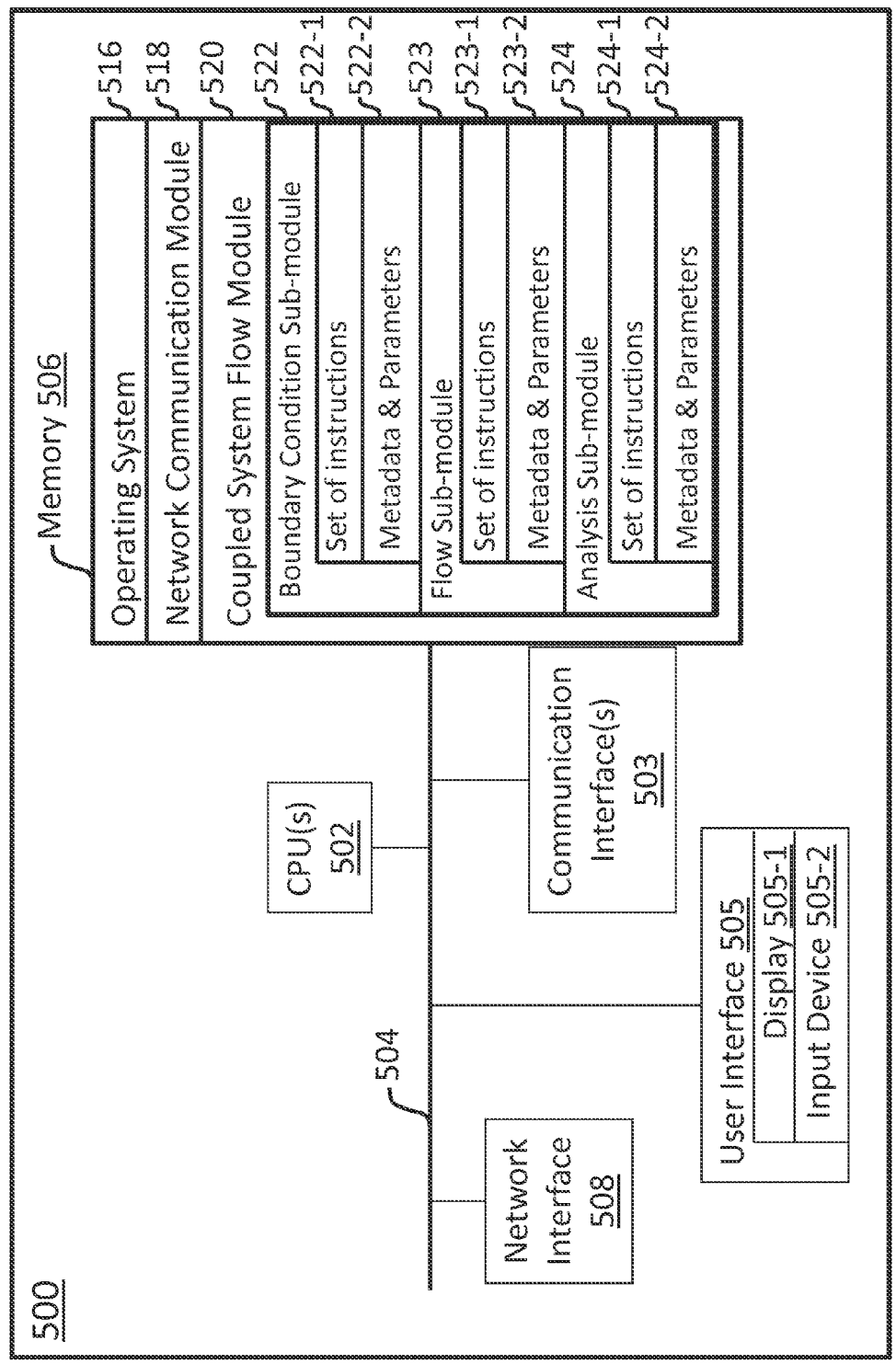
FIG. 2 is a block diagram illustrating a depositional modeling system, in accordance with some embodiments.

FIG. 2 is a block diagram illustrating a depositional modeling system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the depositional modeling system 500 includes one or more processing units (CPUs) 502, one or more network interfaces 508 and/or other communications interfaces 503, memory 506, and one or more communication buses 504 for interconnecting these and various other components. The depositional modeling system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store field data, initial basin/reservoir topography, surfaces from seismic data and/or seismic images, and/or geologic structure information.

In some embodiments, memory 506 or the non-transitory computer readable storage medium of memory 506 stores the following programs, modules and data structures, or a subset thereof including an operating system 516, a network communication module 518, and a coupled system flow module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the coupled system flow module 520 executes the operations of method 100. It may include sub-modules to execute various steps of method 100.

Boundary condition sub-module 522 contains a set of instructions 522-1 and accepts metadata and parameters 522-2 that will enable it to determine boundary conditions for various boundaries as described by method 100. The flow sub-module 523 contains a set of instructions 523-1 and accepts metadata and parameters 532-2 that will enable it to model the coupled system dependent on the boundary conditions. The analysis sub-module 524 contains a set of instructions 524-1 and accepts metadata and parameters 524-2 that will assist in analysis of the modeled processes. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in evolving the governing equations of hydrodynamics and sediment transport. For example, any of the sub-modules may optionally be able to generate a display that would be sent to and shown on the user interface display 505-1. In addition, any of the models or boundary conditions may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 2) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for imposition of geological boundary conditions in process-based depositional models of potential hydrocarbon reservoirs in siliciclastic rocks, comprising:
   a. receiving, at a computer processor, a process-based depositional model of a siliciclastic formation of interest;
   b. determining, via the computer processor, a type of boundary condition at each boundary of the process-based depositional model wherein the boundary condition on at least one boundary is one of a flux-preserving boundary condition or a discrete boundary condition and wherein the boundary condition accounts for at least one of:
      i. time-varying inflow of water and sediments into the process-based depositional model;
      ii. time-varying outflow of water and sediments out of the process-based depositional model; and
      iii. downstream controls;
   c. modeling, via the computer processor, rates of sediment and water flow over time, dependent on the boundary condition, to create a modeled depositional system; and
   d. analyzing the modeled depositional system to identify potential hydrocarbon reservoirs,
      wherein the flux-preserving boundary condition is formulated to provide a time-varying solution on the at least one boundary that solves for wave amplitudes and uses eigenvalues to determine a propagation direction of the sediment and water flow; and
      wherein the discrete boundary condition is formulated to provide a time-varying solution on the at least one boundary wherein equations defining the sediment and water flow have been discretized in space and time and a numerical flux on an internal edge of a cell adjacent to the at least one boundary is a function of a solution of cell-averaged state variables at a previous time step such that the discrete boundary condition is equivalent to finding an unknown boundary flux edge so that an updated solution at a next time step reflects imposed conditions.

2. The method of claim 1 wherein a dynamic criterion based on current flow conditions and sedimentation rates is used to choose between the flux-preserving boundary condition or the discrete boundary condition.

3. The method of claim 1 wherein the downstream controls include eustasy and tidal variations.

4. A computer system, comprising:
   one or more processors;
   memory; and
   one or more programs, wherein the one or more programs are stored in the memory and configured to be executed by the one or more processors, the one or more programs including instructions that when executed by the one or more processors cause the system to
      a. receive a process-based depositional model of a siliciclastic formation of interest;
      b. determine a type of boundary condition at each boundary of the process-based depositional model wherein the boundary condition on at least one boundary is one of a flux-preserving boundary condition or a discrete boundary condition and wherein the boundary condition accounts for at least one of:
         i. time-varying inflow of water and sediments into the process-based depositional model;
         ii. time-varying outflow of water and sediments out of the process-based depositional model; and
         iii. downstream controls;
      c. model rates of sediment and water flow over time, dependent on the boundary condition, to create a modeled depositional system; and
      d. analyze the modeled depositional system to identify potential hydrocarbon reservoirs,
         wherein the flux-preserving boundary condition is formulated to provide a time-varying solution on the at least one boundary that solves for wave amplitudes and uses eigenvalues to determine a propagation direction of the sediment and water flow; and
         wherein the discrete boundary condition is formulated to provide a time-varying solution on the at least one boundary wherein equations defining the sediment and water flow have been discretized in space and time and a numerical flux on an internal edge of a cell adjacent to the at least one boundary is a function of a solution of cell-averaged state variables at a previous time step such that the discrete boundary condition is equivalent to finding an unknown boundary flux edge so that an updated solution at a next time step reflects imposed conditions.

5. A non-transitory computer readable storage medium storing one or more programs, the one or more programs comprising instructions, which when executed by an electronic device with one or more processors and memory, cause the device to
   a. receive a process-based depositional model of a siliciclastic formation of interest;
   b. determine a type of boundary condition at each boundary of the process-based depositional model wherein the boundary condition on at least one boundary is one of a flux-preserving boundary condition or a discrete boundary condition and wherein the boundary condition accounts for at least one of:
      i. time-varying inflow of water and sediments into the process-based depositional model;
      ii. time-varying outflow of water and sediments out of the process-based depositional model; and
      iii. downstream controls;
   c. model rates of sediment and water flow over time, dependent on the boundary condition, to create a modeled depositional system; and
   d. analyze the modeled depositional system to identify potential hydrocarbon reservoirs,
      wherein the flux-preserving boundary condition is formulated to provide a time-varying solution on the at least one boundary that solves for wave amplitudes and uses eigenvalues to determine a propagation direction of the sediment and water flow; and
      wherein the discrete boundary condition is formulated to provide a time-varying solution on the at least one boundary wherein equations defining the sediment and water flow have been discretized in space and time and a numerical flux on an internal edge of a cell adjacent to the at least one boundary is a function of a solution of cell-averaged state variables at a previous time step such that the discrete boundary condition is equivalent to finding an unknown boundary flux edge so that an updated solution at a next time step reflects imposed conditions.

* * * * *